United States Patent
Uppalapati et al.

(10) Patent No.: US 10,761,530 B2
(45) Date of Patent: Sep. 1, 2020

(54) REDUNDANT LOW-VOLTAGE BATTERY SYSTEM OPERATION IN ELECTRIC VEHICLES

(71) Applicant: Faraday & Future Inc., Gardena, CA (US)

(72) Inventors: Dheemanth Uppalapati, Torrance, CA (US); Phillip John Weicker, Los Angeles, CA (US); Xu Yan, Los Angeles, CA (US); Mayank Sikaria, Folsom, CA (US)

(73) Assignee: Faraday & Future Inc., Gardena, CA (US)

( * ) Notice: Subject to any disclaimer, the term of this patent is extended or adjusted under 35 U.S.C. 154(b) by 0 days.

(21) Appl. No.: 16/013,731

(22) Filed: Jun. 20, 2018

(65) Prior Publication Data

US 2019/0391577 A1 Dec. 26, 2019

(51) Int. Cl.
| | |
|---|---|
| *H02J 7/00* | (2006.01) |
| *G05D 1/00* | (2006.01) |
| *B60R 16/04* | (2006.01) |
| *B60R 16/033* | (2006.01) |
| *B60K 6/28* | (2007.10) |
| *B60L 53/30* | (2019.01) |
| *B60L 58/12* | (2019.01) |
| *B60L 50/60* | (2019.01) |

(52) U.S. Cl.
CPC ............ *G05D 1/0077* (2013.01); *B60K 6/28* (2013.01); *B60L 50/66* (2019.02); *B60L 53/30* (2019.02); *B60L 58/12* (2019.02); *B60R 16/033* (2013.01); *B60R 16/04* (2013.01); *H02J 7/0026* (2013.01); *B60Y 2200/91* (2013.01); *B60Y 2200/92* (2013.01); *B60Y 2400/112* (2013.01); *G05D 2201/0213* (2013.01)

(58) Field of Classification Search
CPC ....... G05D 1/0077; B60L 50/66; B60L 58/12; B60L 53/30; B60K 6/28; B60R 16/033; B60R 16/04; H02J 7/0026
USPC .......................................... 320/134; 701/22
See application file for complete search history.

(56) References Cited

U.S. PATENT DOCUMENTS

| | | | | |
|---|---|---|---|---|
| 2006/0267552 A1* | 11/2006 | Baer | ...................... | H02J 7/0054 320/128 |
| 2014/0103859 A1* | 4/2014 | Nishi | .................... | H02J 7/0016 320/103 |

\* cited by examiner

*Primary Examiner* — Zixuan Zhou

(74) *Attorney, Agent, or Firm* — Knobbe, Martens, Olson & Bear, LLP

(57) ABSTRACT

In one aspect, a power system comprises a power bus, a plurality of energy-storage modules, and a controller. Each energy-storage module is coupled to the power bus and comprises an energy-storage device configured to store energy, an electrical circuit safety device configured to detect safe power conditions in the energy-storage module and break an electrical circuit within the energy-storage module based on a detection of unsafe power conditions in the energy-storage module, and a switch configured to selectively couple the energy-storage device to the power bus. The controller is configured to monitor a state of each of the plurality of energy-storage modules and control a state of the power system based on the state of each of the plurality of energy-storage modules.

14 Claims, 4 Drawing Sheets

REDUNDANT LOW-VOLTAGE BATTERY SYSTEM OPERATION IN ELECTRIC VEHICLES

BACKGROUND

Field

The present application relates generally to providing safe operation of vehicles, and more specifically to technology for ensuring that an electrical system of an autonomous or semi-autonomous vehicle, including a redundant electrical system, is operating appropriately to provide safe operation of the autonomous vehicle.

Background

Vehicles including cars, trucks, buses, aerial vehicles, and the like can be operated partly without human supervision (for example, a semi-autonomous vehicle) or wholly without human supervision (for example, a fully autonomous vehicle). For example, the vehicle may include sensors that convey information to a computing system in (or in communication with) the vehicle. The central computer may use such information to determine how to operate the vehicle, for example to make decisions concerning vehicle speed, braking, navigation, and systems usage. Autonomous vehicles (encompassing both semi-autonomous and fully autonomous vehicles) offer solutions for mitigating or overcoming many issues introduced by human drivers, including distractions, tiredness, medical emergencies, and so forth.

SUMMARY

Various implementations of systems, methods and devices within the scope of the appended claims each have several aspects, no single one of which is solely responsible for the desirable attributes described herein. Without limiting the scope of the appended claims, some prominent features are described herein. Other features, aspects, and advantages will become apparent from the description, the drawings, and the claims.

In a first aspect, a power system is disclosed. The power system comprises a power bus, a plurality of energy-storage modules, each energy-storage module coupled to the power bus, and a controller. Each of the energy-storage modules comprises an energy-storage device configured to store energy, an electrical circuit safety device, and a switch. The electrical circuit safety device is configured to detect safe power conditions in the energy-storage module and break an electrical circuit within the energy-storage module based on a detection of unsafe power conditions in the energy-storage module. The switch configured to selectively couple the energy-storage device to the power bus. The controller is configured to monitor a state of each of the plurality of energy-storage modules and control a state of the power system based on the state of each of the plurality of energy-storage modules.

In another aspect, a power system is disclosed. The power system comprises a power bus, a first energy-storage module coupled to the power bus, a second energy-storage module coupled to the power bus, and a controller. The first energy-storage module comprises a first energy-storage device configured to store energy, a first electrical circuit safety device, and a first switch. The first electrical circuit safety device is configured to detect safe power conditions in the first energy-storage module and break a first electrical circuit within the first energy-storage module based on a detection of unsafe power conditions in the first energy-storage module. The first switch is configured to selectively couple the first energy-storage device to the power bus. The second energy-storage module comprises a second energy-storage device configured to store energy, a second electrical circuit safety device, and a second switch. The second electrical circuit safety device is configured to detect safe power conditions in the second energy-storage module and break a second electrical circuit within the second energy-storage module based on a detection of unsafe power conditions in the second energy-storage module. The second switch is configured to selectively couple the second energy-storage device to the power bus. The controller is configured to monitor a state of the first energy-storage module and a state of the second energy-storage module and control a state of the power system based on the states of first and second energy-storage modules.

In another aspect, a method of controlling a state of a power system comprising a power bus, a plurality of energy-storage modules, each energy-storage module coupled to the power bus, and a controller is disclosed. The method comprises detecting safe power conditions in each of the plurality of energy-storage modules. The method also comprises breaking an electrical circuit within each of the energy-storage modules based on a detection of unsafe power conditions in the respective energy-storage module. The method further comprises monitoring a state of each of the plurality of energy-storage modules. The method also further comprises controlling the state of the power system based on the state of each of the plurality of energy-storage modules by selectively coupling each of the energy-storage devices to the power bus based on the state of each of the plurality of energy-storage modules.

BRIEF DESCRIPTION OF THE DRAWINGS

The above-mentioned aspects, as well as other features, aspects, and advantages of the present technology will now be described in connection with various implementations, with reference to the accompanying drawings.

Figure 1:
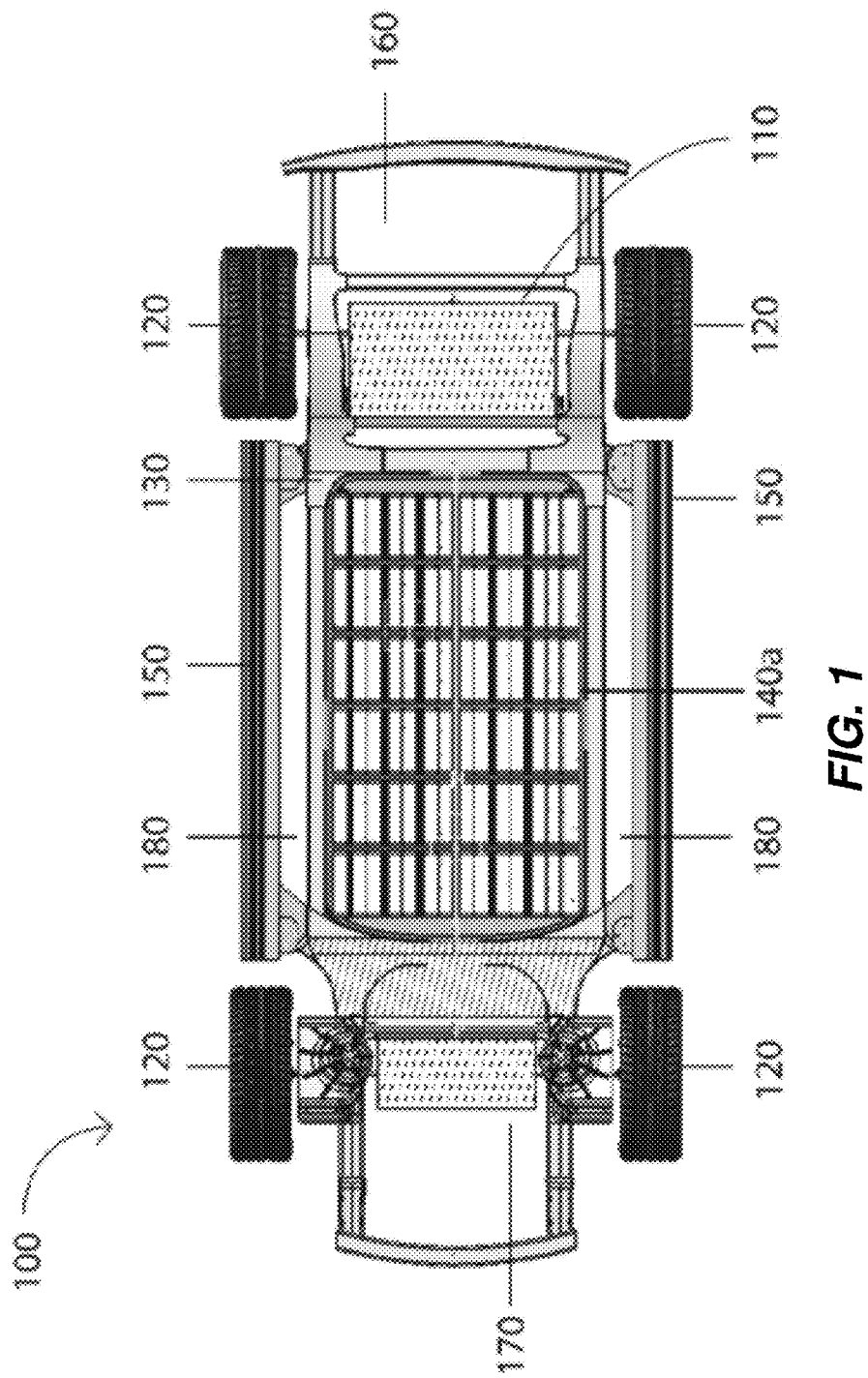
FIG. 1 shows an electric vehicle that may utilize one or more autonomous systems, in accordance with certain embodiments described herein.

The various features illustrated in the drawings may not be drawn to scale. Accordingly, the dimensions of the various features may be arbitrarily expanded or reduced for clarity. In addition, some of the drawings may not depict all of the components of a given system, method or device. For example, various components from one or more drawings may be integrated into one or more other drawings, even if such a combination is not explicitly shown in the drawings. Finally, like reference numerals may be used to denote like features throughout the specification and figures.

DETAILED DESCRIPTION

Aspects of the present disclosure relate to system operation, management, and monitoring of control systems (for example autonomous or semi-autonomous control systems) in electric vehicles (EVs) or other vehicles (for example, non-electric passenger vehicles, hybrid electric vehicles, transport vehicles, etc.) where safe operation of the EV is a concern. Currently EVs and other vehicles may have multiple control systems that manage and monitor operation of the vehicle in an autonomous (semi or fully) mode. These multiple control systems may include various safety interlocks and controls that assist in safe operation of a corresponding autonomous or semi-autonomous mode systems. In many aspects, these control systems are typically powered by a low-voltage power source. If this low-voltage power source fails, the vehicle may be left in an unsafe operating condition, especially if the vehicle was being operated autonomously at the time of the low-voltage power source failure. For example, the vehicle may be in motion and operating in the autonomous mode when the low-voltage power source fails, resulting in the autonomous vehicle making operational determinations based on incomplete sensor data. Thus, failure of power sources presents challenges for autonomous vehicle operation.

In some vehicles, fundamental or critical functions in vehicles such as steering, braking, and acceleration are becoming increasingly fully or partially automated. In some embodiments, peripheral components, including doors, tailgates, etc., are also being automated to elevate user experience, especially in luxury cars. The automated critical functions may be known as advanced driver assistance systems (ADAS) or similar nomenclature and may use a variety of sensors including ultrasonic sensors, camera systems, and Light Detection And Radar (LIDAR) scanners. In some implementations, these sensors and any associated controllers and/or actuators operate on low-voltage (for example, 12-48V) power. As such, any loss of low-voltage power may leave the vehicle unable to function correctly in an autonomous mode. In some embodiments, if low-voltage power is lost during a collision, crash, or any other event, the doors and windows may not be unlockable and inaccessible if they are electrically actuated using the low-voltage power.

Many vehicles may source low-voltage power for systems from one low-voltage battery or source. Therefore, the systems powered by the low-voltage source may have a possible single point of failure (for example, any component of the low-voltage source or a feed from the low-voltage source to the systems), which may result in loss of operation of the systems that are powered by the low-voltage source if low-voltage power is lost.

Accordingly, aspects of the present disclosure address the above-described challenges, among others, to provide highly reliable, safe low-voltage systems with fault detection. The disclosed technology can provide such solutions at costs low enough to enable the deployment of more autonomous vehicles. For example, the disclosed technology includes a redundant low-voltage battery system (for example, a second low-voltage battery or source) and associated monitoring and control techniques. As such, the single point of failure risk may be eliminated, increasing the reliability and safety of autonomous vehicle features. Thus, the low-voltage system may consist of two functionally independent low-voltage batteries or sources.

In some embodiments, each of these low-voltage batteries or sources is called a low-voltage module. Each module may be connected to a low-voltage bus, which can power all or a subset of the sensors, controllers, and actuators that allow the vehicle to be maintained in the safe state when operating in the autonomous mode. Each of the modules may comprise an isolation component (for example, a contactor or relay) configured to isolate the affected module (for example, one of the low-voltage sources) from the other module in the event of a fault (for example, a short circuit) in the affected module. Each of the modules may further comprise one or more fault monitoring circuits or devices that may be used to monitor the modules and alert a controller or user of any fault condition. In some embodiments, each of the modules is capable of maintaining the autonomous mode(s) or systems of the vehicle in a safe state in the event of a fault that compromises the other module. Thus, in the event that one of the modules enters a fault state, the other module, while being isolated from the fault, may function to maintain autonomous operation of the autonomous modes or systems of the vehicle until the operator is able to disengage the autonomous mode.

Beneficially, the disclosed technology is able to provide redundant low-voltage power to the low-voltage systems. Further, the disclosed technology is able to properly monitor states of the low-voltage batteries or modules and the low-voltage systems to ensure proper operation of the low-voltage systems in the event of a fault in one or both of the low-voltage batteries or modules.

For example, a vehicle may have a controller that monitors two low-voltage power sources or sources that each include a low-voltage power supply (for example, a low-voltage battery) and corresponding circuitry and/or hardware. In some embodiments, each of the two low-voltage sources may be configured to provide low-voltage power to one or more low-voltage systems comprising one or more components or sub-systems (for example, sensors, actuators, and so forth) for the vehicle. In some embodiments, the controller may monitor the two low-voltage sources and determine if a fault occurs in one or both of the low-voltage sources. In some embodiments, the two low-voltage sources may be coupled to each other in an event that while the autonomous mode is active, one of the low-voltage sources is available to support the low-voltage systems active in the autonomous mode regardless of operation of the other low-voltage source.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different technologies and system configurations, some of which are illustrated by way of example in the figures and in the following description of the preferred aspects. For example, although described in the context of electric vehicles (for example, vehicles in which the motive force for the vehicle is powered partly or wholly by stored electricity), it will be appreciated that redundant low-voltage power sources can provide similar benefits for low-voltage systems of combustion-powered vehicles (for example, vehicles in which the motive force for the vehicle is powered partly or wholly by combustion), as well as for low-voltage-powered systems of vehicles powered by other energy sources (for example, steam, hydrogen). The detailed description and drawings are merely illustrative of the disclosure rather than limiting, the scope of the disclosure being defined by the appended claims and equivalents thereof.

In electric vehicles (EVs), energy-storage modules may be used in various systems, including high voltage systems, for example, vehicle drive systems, or low-voltage systems, for example, accessory systems. The described systems, methods, and apparatus may be utilized in conjunction with energy-storage modules used in any such system.

The techniques described herein may be used for various EV, hybrid electric vehicle (HEV), or electric motors systems, EV systems, electric power generators, electric pumps, any other electricity powered system that consumes energy from an energy-storage system, or any other fuel power system that consumes energy from an energy-storage system. In some embodiments, the teachings herein may be incorporated into (for example, implemented within or performed by) any semi or fully autonomous system or any redundantly powered system.

FIG. 1 shows an electric vehicle 100 that may utilize one or more autonomous systems or modes, in accordance with certain embodiments described herein. In some embodiments, the electric vehicle may instead be any motor vehicle used for transportation, such as hybrid electric vehicles, plug-in hybrid electric vehicles, and all-electric vehicles, as well as vehicles of other motive power sources that use the disclosed redundant low-voltage power for operation of certain systems. The electric vehicle 100 may be an automobile propelled by one or more electric motors 110. The electric motor 110 can be coupled to one or more wheels 120 through a drivetrain (not shown in FIG. 1). The electric vehicle 100 can include a frame 130 (also known as an underbody or chassis). The frame 130 may comprise a supporting structure of the electric vehicle 100 to which other components can be attached/mounted, such as, for example, a battery pack 140a or a body of the electric vehicle 100 (not shown in FIG. 1). The battery pack 140a may include two types of battery packs or systems: (1) a high-voltage battery pack that can supply electricity to power the one or more electric motors 110, for example, through an inverter; and (2) a low-voltage battery pack that can supply electricity to power one or more low-voltage systems, as described herein. The inverter can change direct current (DC) from the battery pack 140a to alternating current (AC) for the electric motors 110.

As depicted in FIG. 1, the battery pack 140a may have a compact "footprint" and be at least partially enclosed by frame 130 and disposed to provide a predefined separation, from components of the electric vehicle 100 (for example, structural rails 150 of an upper body that couples to frame 130 and so forth). In some embodiments, at least one of a rear crumple zone 160, a front crumple zone 170, and a lateral crumple zone 180 can be formed around the battery pack 140a. In some embodiments, both the frame 130 and the structural rails 150 may protect the battery pack 140a from forces exerted from outside of the electric vehicle 100, such as, for example, in a collision. In some embodiments, one or more low-voltage autonomous control systems or components of such autonomous control systems may be coupled to one or more of the body, frame 130, or other components of the electric vehicle 100.

The battery pack 140a may have a compact "footprint" that includes both the high-voltage and low-voltage battery packs. In some embodiments, the high-voltage battery pack may include one or more high-voltage batteries. Similarly, the low-voltage battery pack may include one or more low-voltage batteries. In some embodiments, the battery pack 140a may include or be coupled to one or more controllers, such as an engine control unit (ECU). The one or more controllers may monitor a state of one or more of the various batteries in the battery pack 140a.

In some embodiments, the low-voltage battery pack may comprise a plurality of low-voltage battery modules that are controlled or monitored by a controller. In some embodiments, the controller and the low-voltage battery pack may be used to provide low-voltage power to one or more components or systems that implement the autonomous mode. For example, a low-voltage battery may be a 12 volt battery. Reference may be made throughout the specification interchangeable to a "low-voltage" source or power system and to a "12 volt" source or power system. It will be readily apparent to a person having ordinary skill in the art that the phrase "12 volt" in the context of automotive electrical systems is an approximate value referring to nominal 12 volt power systems. The actual voltage of a "12 volt" system in a vehicle may fluctuate as low as roughly 4-5 volts and as high as 16-17 volts depending on engine conditions and power usage by various vehicle systems. Such power systems may also be referred to as "low-voltage" systems. Some vehicles may use two or more 12 volt batteries to provide higher voltages. Thus, it will be clear that the systems and methods described herein may be utilized with battery or other power source arrangements in at least the range of 4-34 volts without departing from the spirit or scope of the systems and methods disclosed herein. In some embodiments, a low-voltage battery or source may refer to any battery or source (auxiliary or otherwise) that is used to power low-voltage devices (for example, any non-propulsion related devices) that generally operate in the range of 12-48V.

The high-voltage battery system may be configured to power the vehicle components that require relatively high voltages. For example, the high-voltage battery system may be configured to power one or more electric motors that are used to propel the vehicle (referred to herein as the "powertrain"), HVAC systems for controlling temperature of the high voltage battery system, and vehicle cabin HVAC.

Figure 2:
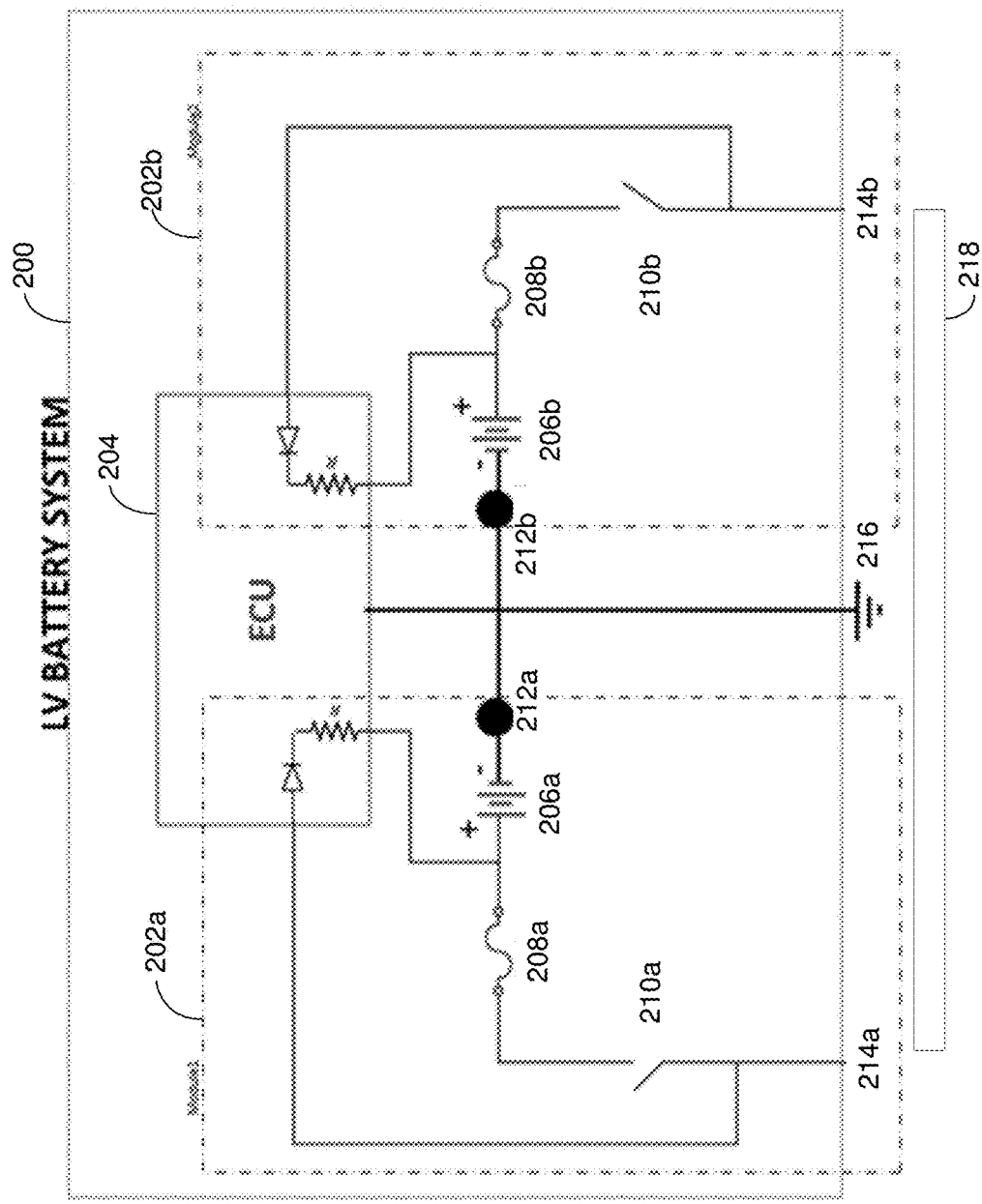
FIG. 2 illustrates a schematic diagram of a low-voltage battery system of the electric vehicle of FIG. 1, the low-voltage battery system comprising two low-voltage battery modules and a controller, in accordance with certain embodiments described herein.

FIG. 2 illustrates a schematic diagram of a low-voltage battery system 200 of the electric vehicle 100 of FIG. 1. In order to provide redundant power as described herein, the low-voltage battery system 200 includes two low-voltage battery modules 202a,b and a controller 204, in accordance with certain embodiments. As noted above, in some embodiments, the low-voltage battery system 200 may be included in a single battery pack 140a that also includes the high-voltage battery pack. In some embodiments, the low-voltage battery system 200 may be separate from the high-voltage battery pack. Each of the low-voltage battery modules 202a,b has the power capability and energy reserve to bring the vehicle to a safe state.

The low-voltage battery modules 202a,b may each comprise a low-voltage battery 206a,b, a fuse or circuit breaker 208a,b, a contactor 210a,b, a current sensor or monitor 212a,b, and a feed 214a,b to a corresponding low-voltage bus system 218. In some embodiments, the low-voltage batteries 206a,b may store and supply low-voltage power to the low-voltage battery module 202a,b and, accordingly, to the feeds 214a,b. The fuses 208a,b can provide circuit protection (for example, voltage spike protection, surge protection, and so forth) to the respective low-voltage battery modules 202a,b and the low-voltage batteries 206a,b. In some embodiments, the fuses 208a,b may operate as electrical circuit safety devices that monitor safe power conditions of the low-voltage battery modules 202a,b. The fuses 208a,b may identify "safe" power conditions of the low-voltage battery modules 202a,b, as being power conditions when the fuse 208a,b does not trip or actuate to protect the low-voltage battery modules 202a,b. The fuses 208a,b may identify "unsafe" power conditions of the low-voltage battery modules 202a,b, as being power conditions when the fuse 208a,b does trip or actuate to protect the low-voltage battery modules 202a,b. Thus, when the fuses are "blown", the power conditions are "unsafe". The contactors 210a,b can provide control over whether or not the voltage from the low-voltage batteries 206a,b is supplied to the corresponding low-voltage bus 218 via the respective feeds 214a,b. The contactors 210a,b may isolate a shorted low-voltage battery 206a,b from the corresponding low-voltage bus 218 or an operational low-voltage battery 206a,b from a shorted low-voltage bus 218. For example, by opening either of the contactors 210a,b, the path of flow from the low-voltage batteries 206a,b through the low-voltage battery modules 202a,b and to the corresponding feeds 214a,b may be broken, preventing the low-voltage batteries 206a,b from feeding to the respective low-voltage buses (which may feed to low-voltage bus 218). The current monitors 212a,b may measure current flow in the respective one of the low-voltage battery modules 202a,b. Though the component functionalities are described together for the battery modules 202a,b, it will be appreciated that these modules are capable of completely independent operation in order to provide redundant power.

The controller 204 includes at least one memory, for example storing computer-executable instructions for performing the described functions, and at least one processor configured by the computer-executable instructions to perform the described functions. The controller 204 can additionally include a memory for storing generated and/or received data. The controller 204 can include networking hardware and associated computer-executable instructions for communicating battery and/or system states to other vehicle components.

The illustrated controller 204 is coupled to both of the low-voltage battery modules 202a,b and to the ground 216. The controller 204 is configured to monitor states of the battery modules 202a,b during operation of the electric vehicle 100 and to control the contactors 210a,b. For example, the controller 204 may monitor the current monitors 212a,b and operation of the low-voltage batteries 206a,b to control the contactors 210a,b. For example, if current monitors 212a,b and the low-voltage batteries 206a,b indicate no faults for the low-voltage batteries 206a,b, then the controller 204 may close one or both of the contactors 210a,b to allow the low-voltage batteries 206a,b to feed their corresponding low-voltage buses via the feeds 214a,b that further feed the low-voltage bus 218. In some embodiments, if one of the current monitors 212a,b or one of the low-voltage batteries 206a,b indicate a fault for one of the low-voltage batteries 206a,b, then the controller 204 may open the corresponding contactor 210a,b to prevent the faulted low-voltage battery 206a,b from feeding its corresponding low-voltage bus via its feed 214a,b, where each low-voltage bus feeds the low-voltage bus 218. At the same time, the controller 204 may close (or keep closed) the other contactor 210a,b to allow the non-faulted low-voltage battery 206a,b to feed its corresponding low-voltage bus via its feed 214a,b, where each low-voltage bus feeds the low-voltage bus 218. Accordingly, when one of the low-voltage battery modules 202a,b is faulted, the other low-voltage battery module 202a,b can provide power to the low-voltage bus 218. The low-voltage buses may be coupled together (for example, via the low-voltage bus 218) such that any low-voltage systems that receive power from one of the low-voltage battery modules 202a,b may receive power from the other low-voltage battery module 202a,b.

In some embodiments, the controller 204 may utilize one or more components to monitor and control operation of the low-voltage batteries 206a,b. The controller 204 may also have additional functionalities such as controlling a trickle charge/pre-charge of the low-voltage batteries 206a,b in situations where the batteries become completed depleted. For example, the controller 204 may utilize a circuit including a resistor and/or a diode to pre-charge/trickle charge the low-voltage batteries 206a,b in a controlled manner and to appropriately exert control over the contactors 210a,b.

The redundant low-voltage battery system 200 may help ensure that the electric vehicle 100 is able to function safely in the event of a fault or other loss of one of the low-voltage battery modules 206a,b. In such an event, the other of the low-voltage battery 206a,b may compensate for the faulted low-voltage battery 206a,b. Both of the low-voltage batteries 206a,b may have capabilities to bring the electric vehicle 100 to a safe state in various events. With both low-voltage batteries 206a,b being connected to low-voltage buses that are coupled together (or to a single low-voltage bus 218) and to the low-voltage systems of vehicle sensors, controllers, and actuators, loss of one of the low-voltage batteries 206a,b does not necessarily result in loss of functionality of the low-voltage systems. The low-voltage battery system 200 may use the controller 204 to analyze the internal state of operation of each of the low-voltage battery modules 202a,b and control the contactors 210a,b. The operations of the controller 204 in view of the states of operation of each of the low-voltage battery modules 202a,b are described in further detail below.

Figure 3:
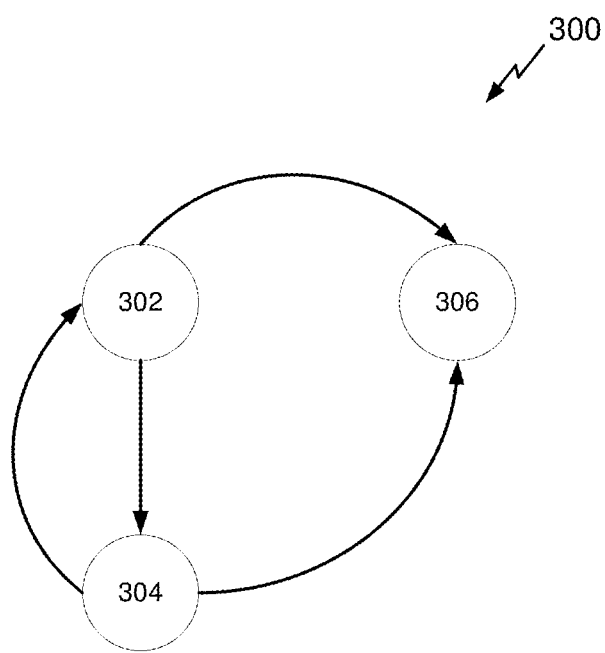
FIG. 3 illustrates a state machine diagram of one of the low-voltage battery modules of FIG. 2, in accordance with certain embodiments described herein.

FIG. 3 illustrates a diagram of a state machine diagram 300 of one of the low-voltage battery modules 202a,b of FIG. 2, in accordance with certain embodiments described herein. A state machine identifies a status or state of a corresponding system at a given time. The state identified by the state machine can change based on inputs, such that the output of the state machine is a function of the input and a current state. The state machine 300 can be implemented in the controller 204, and can be implemented separately for each of the low-voltage battery module 202a,b (for example, a separate state can be determined for each module). As shown, each low-voltage battery module 202a,b may exist in one of three states: a normal operation state 302, a fully discharged state 304, and a fault state 306.

In the normal state 302, the low-voltage battery module 202a,b may have a charge state or a state of charge (SOC) that is within operating limits of the low-voltage battery module 202a,b. The operating limits of the low-voltage battery module 202a,b are defined as a voltage range within which the low-voltage battery system 200 is fully and completely operational. For example, this voltage range of the operating limits may be between 12 and 14.6V. In some embodiments, the voltage range of the operating limits may be between 10 and 16V or may comprise voltages within a range of +/−10% or 20% of the fundamental voltage of the low-voltage battery system 200. Thus, for example, the operating limits for a 48V low-voltage battery system 200 may be 43.2-52.8V while the operating limits for the 12V low-voltage battery system 200 may be 9.6-14.4V. In some embodiments, the low-voltage battery module 202a,b may charge or discharge the low-voltage battery 206a,b according to current limits for the low-voltage batteries 206a,b and/or the low-voltage battery module 202a,b.

From the normal state 302, the low-voltage battery module 202a,b may transition to either the fully discharged state 304 or the fault state 306. In some embodiments, the low-voltage battery module 202a,b may enter the normal state 302 after performing a trickle charge or pre-charge on the low-voltage battery module(s) 202a,b.

In the fully discharged state 304, the low-voltage battery module 202a,b may not have any charge or may have insufficient charge to operate any devices coupled to the low-voltage battery module 202a,b. For example, the charge of the low-voltage battery 206a,b may be below a threshold (for example, a predetermined percentage of full charge capacity), or may be zero. In some embodiments, when in the fully discharged state 304, the low-voltage battery module 202 may need a jump start using an external power source to begin operating or to begin charging via a trickle charge or other charge.

From the fully discharged state 304, the low-voltage battery module 202a,b may transition to either the fault state 306 or to the normal operation state 302.

In the fault state 306, the low-voltage battery module 202a,b may be in a faulted condition. For example, the low-voltage battery module 202a,b may not be safe to operate or may not be able to be operated. For example, when in the fault state 306, the one or more components of the low-voltage battery module 202a,b may be short circuited, presenting an open circuit, or otherwise damaged or in a condition not allowing for normal operation, charging, discharging, and so forth. In some embodiments, the low-voltage battery module 202a,b may enter the fault condition 306 when any component therein is faulted (for example, presenting the short circuit, open circuit, or other condition not allowing for normal operation, charging, discharging, and so forth) for a threshold duration.

In some implementations, when in the fault state 306, the low-voltage battery module 202a,b may not transition to any other state. For example, when in the fault state 306, the low-voltage battery module 202a,b may need to be replaced or repaired to place it into another state.

In some embodiments, transitions between the states as shown may be automatic or may be controlled by the low-voltage battery module 202a,b, for example, by the controller 204. In some embodiments, the transitions between the states as shown may be controlled by an external controller. In some embodiments, the controller 204 may be operated according to the state machine diagram 300 for each of the low-voltage battery modules 202a,b. Accordingly, the low-voltage battery system 200 comprising both the low-voltage battery modules 202a,b and the controller 204 may exist in a state that depends on the states of the low-voltage battery modules 202a,b. For example, a state of the low-voltage battery system 200 may be determined based on the states of the low-voltage battery modules 202a,b.

In some embodiments, other states not shown in the state machine diagram 300 may exist. For example, a trickle charge or pre-charge state may exist, during which an external power source can be connected to jump start the low-voltage battery 206a,b. Trickle charging or pre-charging refers to charging the low-voltage battery 206a,b with a low current to avoid a large inrush current. This rate of energy transfer into the low-voltage battery 206a,b is referred to as a "trickle." For example, at least at the initiation of the trickle charge state, the low-voltage battery module 202a,b may not have sufficient charge to operate in the normal state 302 or any other state. For example, the low-voltage battery module 202a,b may be in the fully discharged state 304. In some embodiments, the low-voltage battery module 202a,b may be receiving a charge from an external device or an internal device. In some embodiments, when in the trickle charge state, the low-voltage battery module 202a,b may be coupled to the external power source to receive a jump start. In some embodiments, to avoid exposure of the low-voltage battery module 202a,b to high charging currents (which may increase the temperature to a range that causes damage to the low-voltage battery 206a,b), the jump start via the external power source may be via a trickle charge circuit. Beneficially, this can result in a more reliable charge and longer battery life compared to quick jump charges. In some embodiments, the low-voltage battery module 202a,b may only be in the trickle charge state for a short duration or until a charge of the low-voltage battery module 202a,b (for example, the charge of the low-voltage battery 206a,b) reaches a threshold level.

When in the trickle charge state, the low-voltage battery module 202a,b may transition to the normal operation state 302 when the charge in the low-voltage battery module 202a,b reaches the threshold level or after a threshold duration.

Figure 4:
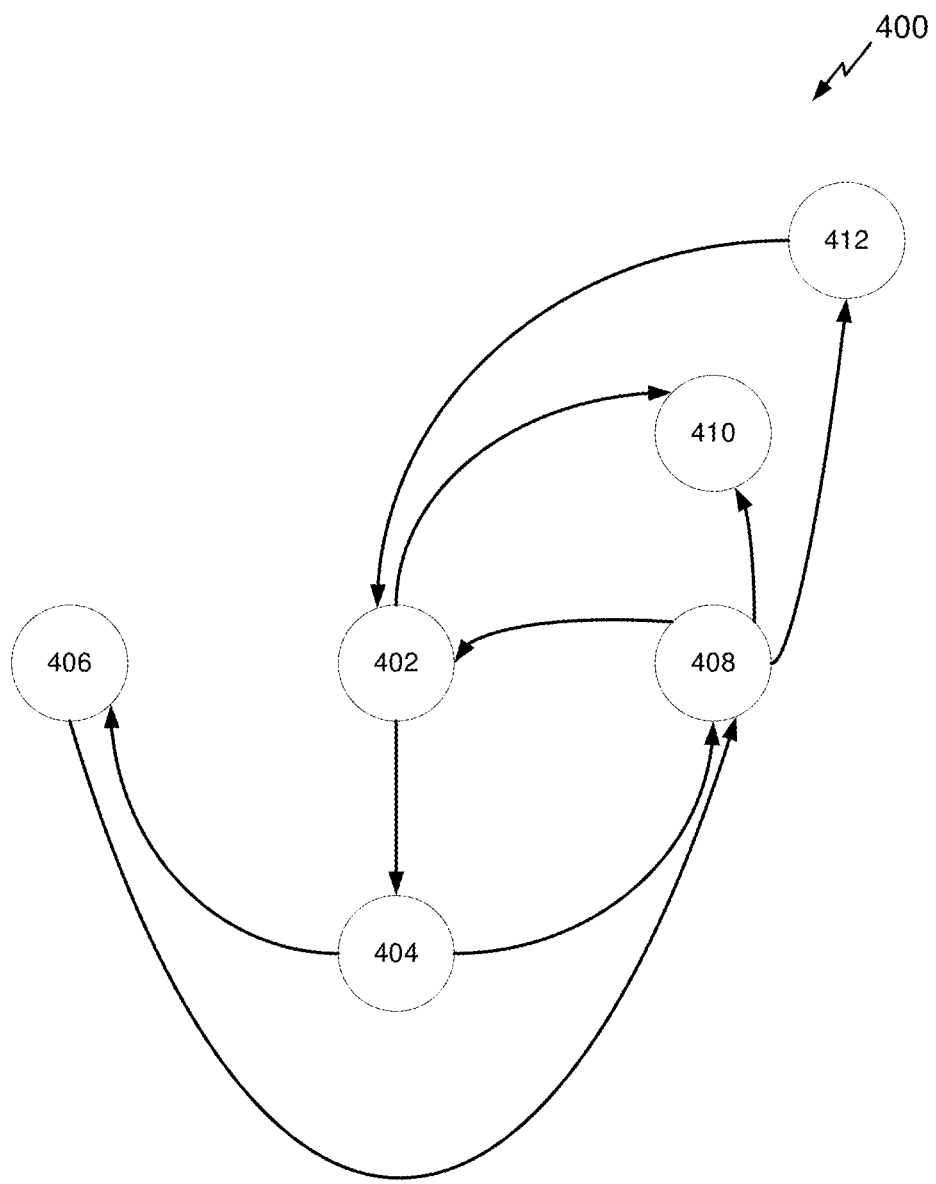
FIG. 4 illustrates a state machine diagram of the low-voltage battery system of FIG. 2, in accordance with certain embodiments described herein.

FIG. 4 illustrates a state machine diagram 400 of the low-voltage battery system 200 of FIG. 2, in accordance with certain embodiments described herein. As shown, the low-voltage battery system 200 may exist in one of six states: a normal operation state 402, a sleep state 404, a deep sleep state 406, a startup state 408, a fault state 410, and a trickle charge state 412. These system states are determined based on the module states of one or both battery modules. For example, the controller 204 can execute the state machine 300 to determine the module state of one or both of the low-voltage battery modules 202a,b, and then may use the determined state(s) as input into the state machine 400.

In the normal state 402, the low-voltage battery system 200 may have at least one (and possibly all) low-voltage battery modules 202a,b operating in the normal operation state 302, as described above in relation to FIG. 3. When in the normal operation state 402, the low-voltage battery system 200 may be configured and able to provide low-voltage power to one or more low-voltage components of the vehicle 100, for example via the low-voltage bus 218.

From the normal operation state 402, the low-voltage battery system 200 may transition to the fault state 410 or to the sleep state 404.

In the sleep state 404, the low-voltage battery system 200 may have at least one low-voltage battery module 202a,b operating in the normal operation state 302 and no faulted or fully discharged low-voltage battery module 202a,b while the vehicle 100 is in a sleep state or mode. The sleep state or mode for the vehicle 100 may be identified when there is no traffic seen on a Controller Area Network (CAN) bus of the vehicle 100. In some embodiments, a transition from the normal operation state 402 to the sleep state 404 depends on whether other systems are functions of the vehicle 100 are "sleeping" or in operation. In some embodiments, other parameters may control the transition from the normal operation state 402 to the sleep state 404, for example, no detected current discharge or charge or detected inactivity from other systems of the EV (for example, for a threshold amount of time). The sleep mode for the vehicle 100 may limit discharge of the low-voltage battery module 202a,b when low-voltage power is not needed. Accordingly, during the sleep state 404, there may not be communications between different components in the vehicle 100. While in the state 404, the vehicle 100 may not be expending or using any (or minimal) power from the low-voltage batteries 206a,b or any other source(s).

From the sleep state 404, the low-voltage battery system 200 may transition to the deep sleep state 406 or to the startup state 408.

In the deep sleep state 406, the low-voltage battery system 200 may include one or more low-voltage battery modules 202a,b in a fully discharged state 304 with no faulted low-voltage battery modules 202a,b. In some embodiments, the deep sleep state 406 may comprise the one or more low-voltage battery modules 202a,b in the fully discharged state 304 having a voltage or a state of charge (SOC) that is below a given threshold (for example, a low voltage or discharge threshold). The remaining low-voltage battery module(s) 202a,b may be in either the normal operation state 302 or the fully discharged state 304.

From the deep sleep state 406, the low-power battery system may transition to the startup state 408.

In the startup state 408, the low-voltage battery system 200 may include one or more startup checks and/or fault checks (for example, short circuit tests, open circuit tests, and so forth) for all low-voltage battery modules 202a,b in the low-voltage battery system 200. In some embodiments, the controller 204 may be configured to perform the one or more startup checks and/or fault checks. In some embodiments, based on the outcome of these checks, the controller 204 may transition the low-voltage battery system 200 to another state in FIG. 4. In some embodiments, transitioning from the startup state 408 may be based on each of the low-voltage battery modules 202a,b successfully passing all the startup and/or fault checks. In some embodiments, only one of the low-voltage battery modules 202a,b may be required to pass all the startup and/or fault checks. In some embodiments, the startup and/or fault checks may be different for different low-voltage battery modules 202a,b. In some embodiments, the startup and/or fault checks may be the same for all low-voltage battery modules 202a,b of the low-voltage battery system 200. In some embodiments, the startup state 408 may also comprise any initialization or similar routines or steps that are used to place the low-voltage battery modules 202a,b in an operable state (for example, one of the other states in the state machine diagram 400.

In some embodiments, the checks that occur during or as part of the startup state 408 may be performed after low-voltage battery system 200 is in a deep sleep state 406 or a sleep state 404. In some embodiments, the checks of the startup state 408 may be performed after the fault state 410. For example, the low-voltage battery system 200 (and the corresponding low-voltage battery modules 202a,b) may need to pass the checks of the startup state 408 to transition from either the sleep state 404, deep sleep state 406, or the fault state 410 to the normal operation state 402 or any other state.

From the startup state 408, the low-power battery system 200 may transition to the normal operation state 402, the fault state 410, and/or the trickle charge state 412.

In the fault state 410, the low-voltage battery system 200 may include one or more of the low-voltage battery modules 202a,b being in the fault state 306. When in the faulted state 410, the low-voltage battery system 200 may be unable to operate in any of the other states of the state machine diagram 400. For example, in some embodiments, when the low-voltage battery system 200 is in the fault state 410, neither of the low-voltage battery modules 202a,b may be used to provide power or charge to low-voltage systems because redundancy is not available (due to the faulted low-voltage battery module 202a,b). In some embodiments, when the low-voltage battery system 200 is in the fault state 410, user or other manual intervention may be required to reset or correct the fault conditions plaguing the low-voltage battery module(s) 202a,b. In some embodiments, when the low-voltage battery system 200 is in the fault state 410, one or both of the low-voltage battery modules 202a,b may need to be replaced.

In some embodiments, the low-power battery system 200 may transition from the fault state 410 to the startup state 408. In some embodiments, the low-voltage battery system 200 may transition to one of the other states of the state machine diagram 400 (for example, to the trickle charge state 412 when the replacement low-voltage battery module 202a,b is in the fully discharged state 304).

In the trickle charge state 412, the low-voltage battery system 200 may be trickle charging or pre-charging one or both of the low-voltage battery modules 202a,b. In some embodiments, the low-voltage battery modules 202a,b may be charged from a higher voltage battery (for example, via a DC-DC converter) or from an external power source (for example, an external low/high voltage power supply).

In some embodiments, the low-power battery system 200 may transition from the trickle charge state 412 to the normal operation state 402 or the sleep state 404. In some embodiments, the low-voltage battery system 200 may transition to one of the other states of the state machine diagram 400 (for example, to the deep sleep state 406 or the fault state 410).

In some embodiments, the controller 204 may monitor the low-voltage battery modules 202a,b and determine, based on the one or more states of the low-voltage battery modules 202a,b (for example, based on the state machine diagram 300), the one or more states of the low-voltage battery system 200. In some embodiments, a combination of states for the low-voltage battery modules 202a,b may result in an undefined state for the low-voltage battery system 200. Thus, such combinations of states may not be desirable or possible in operation. In some embodiments, the state of the low-voltage battery system 200 may be determined based on the states in Table 1:

| Module 202a State | Module 202b State | System 200 State |
|---|---|---|
| Normal Operation | Normal Operation | Normal Operation/Sleep |
| Normal Operation | Fully Discharged | Deep Sleep |
| Normal Operation | Faulted | Faulted |
| Fully Discharged | Normal Operation | Deep Sleep |
| Fully Discharged | Fully Discharged | Deep Sleep |
| Fully Discharged | Faulted | Faulted |
| Faulted | Normal Operation | Faulted |
| Faulted | Fully Discharged | Faulted |
| Faulted | Faulted | Faulted |

Other Considerations

It should be understood that any reference to an element herein using a designation such as "first," "second," and so forth does not generally limit the quantity or order of those elements. Rather, these designations can be used herein as a convenient wireless device of distinguishing between two or more elements or instances of an element. Thus, a reference to first and second elements does not mean that only two elements can be employed there or that the first element can precede the second element in some manner. Also, unless stated otherwise a set of elements can include one or more elements.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

For example, "a processor configured to carry out recitations A, B and C" can include a first processor configured to carry out recitation A working in conjunction with a second processor configured to carry out recitations B and C.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, for example, a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (for example, tangible media). In addition, in some aspects computer readable medium may comprise transitory computer readable medium (for example, a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (for example, RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A power system comprising:
  a power bus;
  a plurality of energy-storage modules, each energy-storage module coupled to the power bus and comprising:
    an energy-storage device configured to store energy,
    an electrical circuit safety device configured to:
      detect safe power conditions in the energy-storage module, and break an electrical circuit within the energy-storage module based on a detection of unsafe power conditions in the energy-storage module,
a charge circuit configured to provide voltage to the respective energy-storage device at a normal energy transfer rate and at a trickle energy transfer rate lower than the normal energy transfer rate; and
a switch configured to selectively couple the energy-storage device to the power bus; and
a controller configured to:
monitor a state of each of the plurality of energy-storage modules, wherein:
a respective energy-storage module is in a "faulted" state when the unsafe power conditions are detected in the energy-storage module,
a respective energy-storage module is in a "normal operation" state when the energy-storage module is not in the faulted state and a state of charge of the corresponding energy-storage device is greater than or equal to a threshold value, and
a respective energy-storage module is in a "fully discharged" state when the energy storage module is not in the faulted state and the state of charge of the corresponding energy-storage device is less than the threshold value, and
control a state of the power system based on the state of each of the plurality of energy-storage modules, wherein:
the state of the power system is "normal operation" if each of the plurality of energy-storage modules is in the normal operation state,
the state of the power system is "faulted" if any of the plurality of the energy-storage modules is in the faulted state, and
the state of the power system is "sleep" if any of the plurality of the energy-storage modules is in the fully discharged state and each of the plurality of the energy-storage modules is not in a faulted state;
wherein, if the power system is in the normal operation state, the charge circuit of each energy-storage module provides voltage to the respective energy-storage device at the normal energy transfer rate; and
if the power system is in the sleep operation state, the charge circuit of one or more of the plurality of energy-storage modules provides voltage to the respective energy-storage device at the trickle energy transfer rate.

2. The power system of claim 1, wherein the controller is further configured to control operation of the switch of particular ones of the plurality of energy-storage modules based on a condition of the respective electrical circuit safety device.

3. The power system of claim 1, wherein the faulted condition of the particular energy-storage module is based on at least a state of the electrical circuit safety device of the respective energy-storage device.

4. The power system of claim 1, wherein the plurality of energy-storage modules comprises a first energy-storage module and a second energy-storage module and wherein the power bus comprises a first power bus leg coupled to the first energy-storage module and a second power bus leg coupled to the second energy-storage module.

5. The power system of claim 1, wherein each of the plurality of energy-storage modules further comprises a current sensor configured to determine a current flow within the respective energy-storage module and wherein the controller is configured to control operation of the switch of each of the plurality of energy-storage modules based on the state of the energy-storage module based on the respective current flow in each of the energy-storage modules.

6. A vehicle power system comprising:
a high-voltage power system comprising a high-voltage battery pack configured to supply electricity to one or more motors configured to propel the vehicle; and
a low-voltage power system, different from the high-voltage power system, comprising:
a power bus;
a plurality of battery modules configured to supply electricity to one or more autonomous control systems;
a first battery module of the plurality of battery modules coupled to the power bus and comprising:
a first battery configured to store energy,
a first electrical circuit safety device configured to:
detect safe power conditions in the first battery module, and
break an electrical circuit within the first battery module based on a detection of unsafe power conditions in the first battery module, and
a first switch configured to selectively couple the first battery to the power bus;
a second battery module of the plurality of battery modules coupled to the power bus and comprising:
a second battery configured to store energy,
a second electrical circuit safety device configured to:
detect safe power conditions in the second battery module, and
break an electrical circuit within the second battery module based on a detection of unsafe power conditions in the second battery module, and
a second switch configured to selectively couple the second battery to the power bus; and
a controller configured to:
monitor a state of each of the first and second battery modules, and
control a state of the power system based on the state of each of the first and second battery modules.

7. The system of claim 6, wherein the controller is further configured to control operation of the first switch of the first battery module based on a condition of the first electrical circuit safety device and control operation of the second switch of the second battery module based on a condition of the second electrical circuit safety device.

8. The system of claim 6, wherein the state of the first battery module is based on a state of charge of the first battery and whether the first battery module is in a faulted condition, wherein the faulted condition of the first battery module is based on at least a state of the first electrical circuit safety device, wherein the state of the second battery module is based on a state of charge of the second battery and whether the second battery module is in a faulted condition, and wherein the faulted condition of the second battery module is based on at least a state of the second electrical circuit safety device.

9. The system of claim 8, wherein the first battery module is in the faulted condition when the first electrical circuit safety device detects the unsafe power conditions in the first battery module and wherein the second battery module is in the faulted condition when the second electrical circuit safety device detects the unsafe power conditions in the second battery module.

10. The system of claim 9, wherein the state of the first battery module is "normal operation" when the state of charge of the first battery is greater than or equal to a threshold value and when the first battery module is not in the faulted condition, wherein the state of the first battery module is "faulted" when the first battery module is in the faulted condition, wherein the state of the first battery modules is "fully discharged" when the state of charge of the first battery is less than the threshold value and when the first battery module is not in the faulted condition, wherein the state of the second battery module is "normal operation" when the state of charge of the second battery is greater than or equal to a threshold value and when the second battery module is not in the faulted condition, wherein the state of the second battery module is "faulted" when the second battery module is in the faulted condition, and wherein the state of the second battery modules is "fully discharged" when the state of charge of the second battery is less than the threshold value and when the second battery module is not in the faulted condition.

11. The system of claim 10, wherein the state of the power system is "normal operation" when the state of first and second battery modules is "normal operation" and wherein the state of the power system is "faulted" if either of the first or second battery modules is in the faulted condition.

12. The system of claim 6, wherein the first battery module further comprises a first trickle charge circuit configured to provide a first voltage at a low rate of energy transfer to the first battery and wherein the second battery module further comprises a second trickle charge circuit configured to provide a second voltage at a low rate of energy transfer to the second battery.

13. The system of claim 6, wherein the first battery module further comprises a first current sensor configured to determine a first current flow within the first battery module and wherein the controller is configured to control operation of the first switch based on the state of the first battery module and the first current flow and wherein the second battery module further comprises a second current sensor configured to determine a second current flow within the second battery module and wherein the controller is configured to control operation of the second switch based on the state of the second battery module and the second current flow.

14. A method of controlling a state of a power system comprising a power bus, a plurality of energy-storage modules, each energy-storage module coupled to the power bus, and a controller, the method comprising:

detecting safe power conditions in each of the plurality of energy-storage modules;
breaking an electrical circuit within each of the energy-storage modules based on a detection of unsafe power conditions in the respective energy-storage module;
monitoring a state of each of the plurality of energy-storage modules, wherein:
  a respective energy-storage module is in a "faulted" state when the unsafe power conditions are detected in the energy-storage module,
  a respective energy-storage module is in a "normal operation" state when the energy-storage module is not in the faulted state and a state of charge of the corresponding energy-storage device is greater than or equal to a threshold value, and
  a respective energy-storage module is in a "fully discharged" state when the energy storage module is not in the faulted state and the state of charge of the corresponding energy-storage device is less than the threshold value; and
controlling the state of the power system based on the state of each of the plurality of energy-storage modules by selectively coupling each of the energy-storage devices to the power bus based on the state of each of the plurality of energy-storage modules, wherein:
  the state of the power system is "normal operation" if each of the plurality of energy-storage modules is in the normal operation state,
  the state of the power system is "faulted" if any of the plurality of the energy-storage modules is in the faulted state, and
  the state of the power system is "sleep" if any of the plurality of the energy-storage modules is in the fully discharged state and each of the plurality of the energy-storage modules is not in a faulted state;
wherein, if the power system is in the normal operation state, the charge circuit of each energy-storage module provides voltage to the respective energy-storage device at the normal energy transfer rate; and
if the power system is in the sleep operation state, the charge circuit of one or more of the plurality of energy-storage modules provides voltage to the respective energy-storage device at the trickle energy transfer rate.

* * * * *